July 24, 1928.  
J. G. BLUNT  
1,678,322  
FOUR-WHEEL TRUCK FOR RAILROAD VEHICLES  
Filed April 5, 1927   3 Sheets-Sheet 1
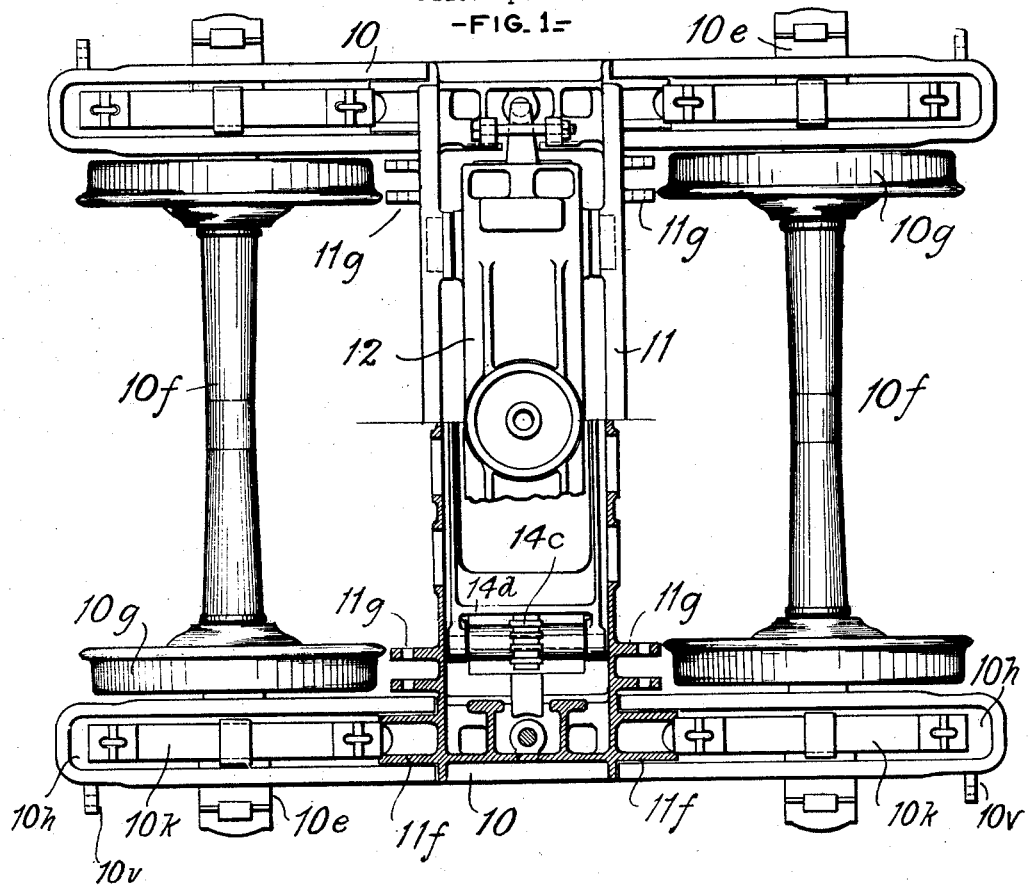
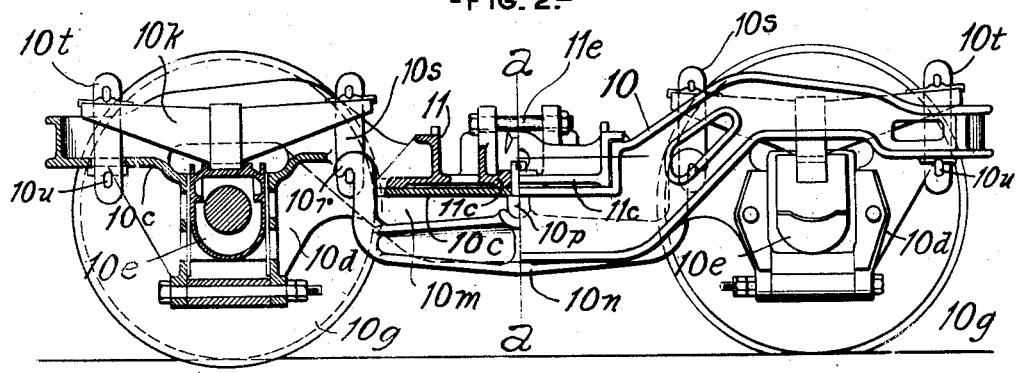
WITNESSES  
INVENTOR

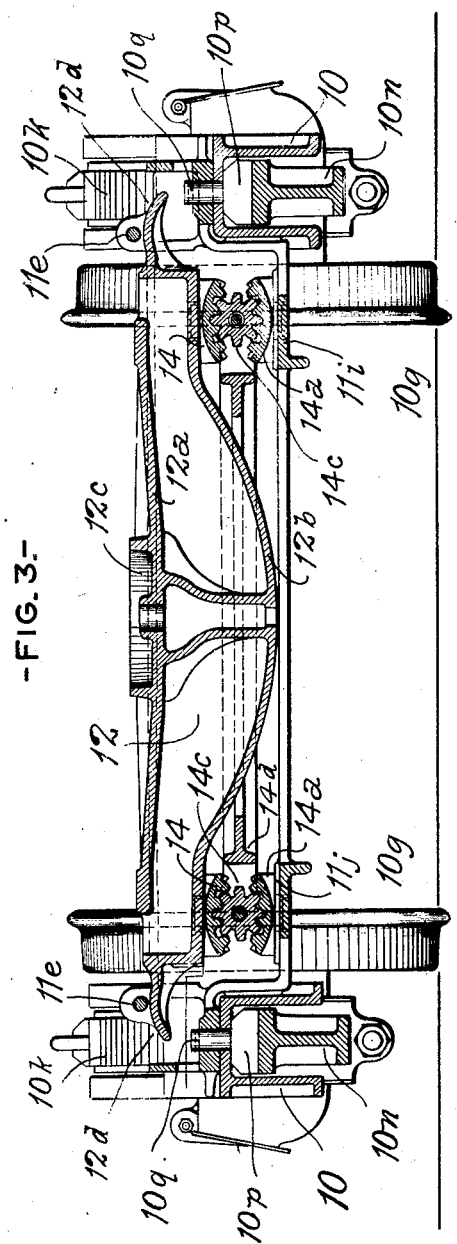

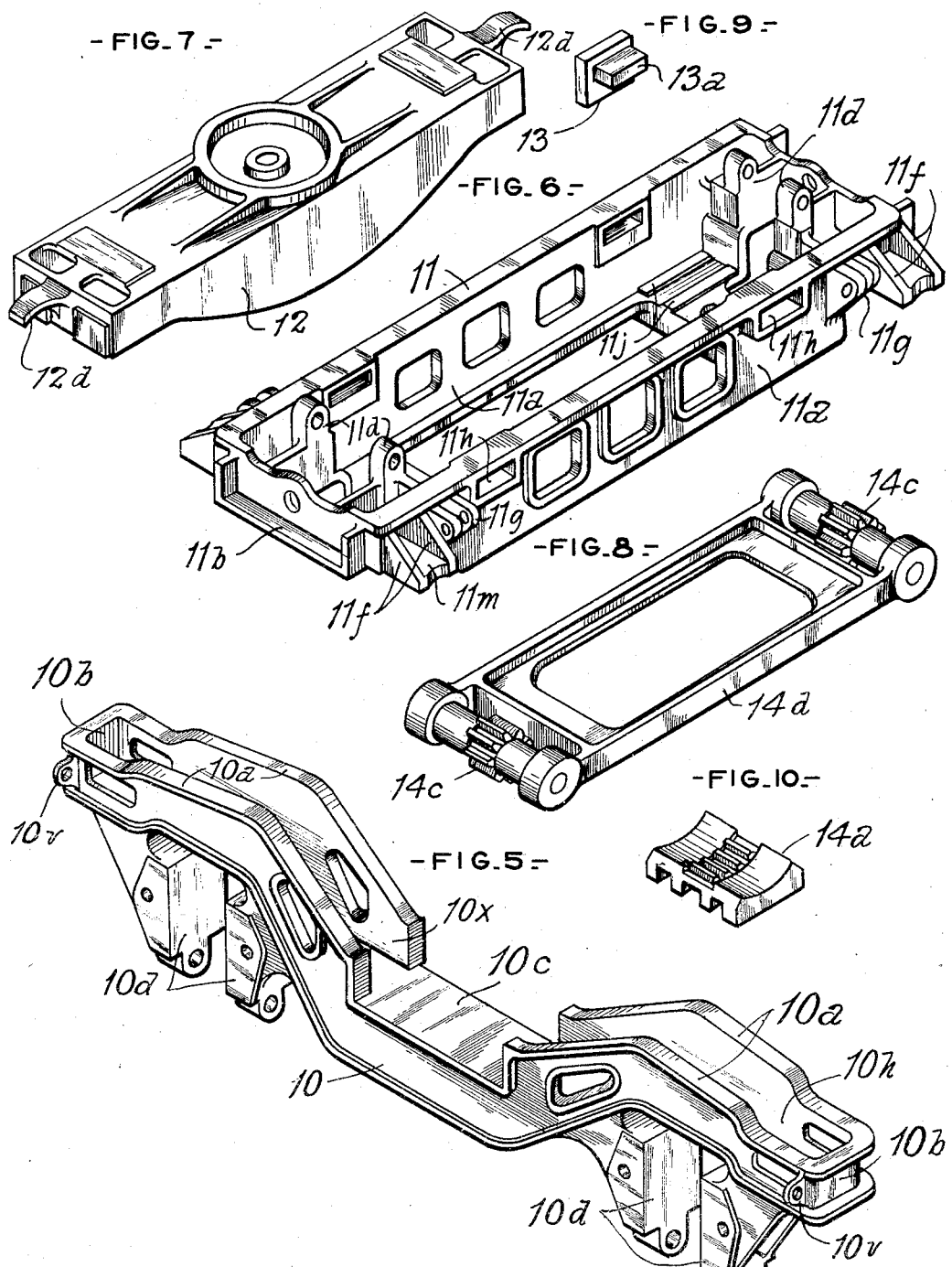

Patented July 24, 1928.

1,678,322

UNITED STATES PATENT OFFICE.

JAMES G. BLUNT, OF SCHENECTADY, NEW YORK.

FOUR-WHEEL TRUCK FOR RAILROAD VEHICLES.

Application filed April 5, 1927. Serial No. 181,026.

My invention has for an object, to provide a truck, which is fabricated of a minimum number of parts, which are assembled into a unitary structure, without the necessity of embodying the usual machined surfaces and bolted fastenings; which is of rugged, compact, and durable construction; which provides for properly equalizing the imposed weight between the two axles; which provides for the requisite lateral movements of the bolster which is economical to manufacture; and which is thoroughly efficient in operation.

In the accompanying drawings: Figure 1 is a plan view, partly in section, of a truck embodying my invention; Fig. 2, a side view, partly in elevation, and partly in section, of the construction shown in Fig. 1; Fig. 3, a view, in vertical, transverse section, taken on the line $a\,a$ of Fig. 2; Fig. 4, an end view, in elevation, of the truck shown in Fig. 1; Fig. 5, an isometrical view of one of the side frames; Fig. 6, a similar view of the transom; Fig. 7, a similar view of the bolster; Fig. 8, a similar view of the geared rollers and frame; Fig. 9, a similar view of one of the wear shoes; and, Fig. 10, a similar view of one of the roller seats.

The invention claimed is hereinafter fully set forth.

In the practice of my invention, referring descriptively to the specific embodiment thereof which is herein-exemplified, the truck comprises two side frame members, 10, of similar construction, which enables them to be economically manufactured by the use of a single form of pattern. Each side frame member is made as an integral casting, and comprises two parallel, spaced, vertical walls, $10^a$, which are depressed intermediate their ends to provide a seat for the transom, 11. The side walls, $10^a$, are connected together by vertical end walls, $10^b$, and horizontal walls, $10^c$. Pedestals, $10^d$, are provided, one at each end of the side frames, which pedestals receive journal boxes, $10^e$, mounted on the axles, $10^f$, of the wheels, $10^g$. The improved construction provides a pocket, $10^h$, at each end of the side frames, for a semielliptic spring, $10^k$, which is mounted on the journal box. A pocket, $10^m$, is also provided between the pedestals, for the equalizing lever, $10^n$, which is fulcrumed on the rounded head, $10^p$, of the bolt, $10^q$, by which the transom is fastened to the side frame. The equalizing lever is provided, at each end, with an upwardly extending vertical arm, which terminates in a hook, $10^r$, which engages the hanger, $10^s$, connected to the inner end of the spring. The outer ends of the springs are connected to the hangers, $10^t$, which are attached to the side frames by the gibs, $10^u$. A safety chain lug, $10^v$, is provided at each end of the outer side wall of the side frames.

The transom, 11, by which the side frames are connected together, is an integral casting, comprising two vertical side walls, $11^a$, made of a reduced height at each end to provide extensions, $11^b$, which engage seats on the side frames. Each of the extensions, $11^b$, has a bottom wall, $11^c$, provided with an opening for the bolt, $10^q$, by which the transom is secured to the side frames. Each extension, $11^b$, is also formed with two parallel, upwardly extending, vertical lugs, $11^d$, which are provided, near their tops, with openings for the bolt, $11^e$, that serves to limit the distance the bolster, 12, can rise from its seat.

For the purpose of securely locking the transom to the side frames, each of the extensions, $11^b$, is formed, at each side, with a tongue, comprising two laterally extending vertical walls, $11^f$, which are connected together by a horizontal wall, $11^m$. The tongues fit in the recesses or grooves, $10^x$, between the side walls of the side frames, thus securing the transom to the side frames.

A pair of brake shoe hanger lugs, $11^g$, is formed on each of the side walls of the transom, near each end thereof. An opening, $11^h$, is formed, near each end of each of the side walls of the transom, which openings receive the lugs, $13^a$, of the shoes, 13, employed to take up the wear caused by lateral movement of the bolster.

The bolster, 12, which is of the fish belly type, is formed as an integral casting, and comprises a compression member, $12^a$, and a tension member, $12^b$. The compression member is formed with a centre plate, $12^c$.

To provide for lateral movement of the bolster, a lateral motion device is employed. This device comprises upper roller seats, 14, which are secured, one to each end of the bolster, and lower roller seats, $14^a$, which are secured, one to each end of the transom. The lower roller seats rest on ribs, $11^j$, formed on the bottom walls, $11^i$, of the transom.

These ribs may be readily chipped smooth and level, for engagement by the roller seats, without the necessity of machining. The roller seats must be spaced apart with accuracy, and, to this end, the spaces between the dowel pins, formed on their bottom faces, and the holes in the walls, 11¹, in which the pins loosely fit, are filled with metal, after the plates are adjusted, and the filling metal is then welded in place.

Each of the roller seats is formed with an arcuate bearing face, which has a central rack for engagement with the teeth of a geared roller, 14ᶜ.

To provide for simultaneous movement of the geared rollers, at opposite sides of the truck, they are revolvably mounted in a frame, 14ᵈ.

To limit the height to which the bolster may rise from the transom, and thus prevent unmeshing of the teeth of the geared rollers from the racks, the bolster is formed, at each end, with an extension, 12ᵈ, fitting between the lugs, 11ᵈ, on the transom. When an end of the bolster rises to a predetermined maximum height, it engages the bolt, 11ᵉ, which prevents further vertical movement.

I claim as my invention and desire to secure by Letters Patent:

1. A four wheel truck for railroad vehicles, comprising two side frame members, each embodying two pedestals, and two spaced parallel side walls, the spaced side walls providing recesses intermediate the pedestals, for locking tongues, and pockets for springs, one pocket being disposed above each pedestal; and a cross member, having an extension at each end, extending over and bearing on a side frame, each of said extensions having two oppositely disposed tongues, fitted into the recesses in the juxtaposed side frame.

2. A four wheel truck for railroad vehicles, comprising two side frame members, each embodying two pedestals and two spaced parallel side walls, the spaced side walls providing recesses intermediate the pedestals, for locking tongues, and pockets for springs, one pocket being disposed above each pedestal; a journal box in each pedestal; a plate spring, fitted in each spring pocket, and bearing on a journal box; an equalizing lever, disposed between the pedestals of each side frame, and fulcrumed, intermediate its length, to the side frame; means, connecting each end of the equalizing lever to the end of one of the springs; means for connecting the other ends of the springs to a side frame member; and a transom having tongues at each of its ends, by which it is locked to the side frame members.

3. A four wheel truck for railroad vehicles, comprising two side frame members, each having two pedestals; a transom, having two parallel side walls, and a portion at each end, extending over and bearing on a side frame, intermediate the pedestals; tongue and groove means for locking the transom to each of the side frames; a bolster, fitted for lateral movement between the vertical side walls of the transom; and means permitting limited lateral movement of the bolster on curved track, and for restoring the bolster to central position on tangent track.

4. A four wheel truck for railroad vehicles, comprising two side frame members, each embodying two pedestals; a transom, connecting the side frames, and disposed between the pedestals; tongue and groove means, connecting each end of the transom to a side frame; a bolster, fitted for lateral movement in the transom; an upper roller seat, disposed at each end of the bolster, and comprising a rack; a lower roller seat at each end of the transom, comprising a rack; a roller, disposed between each upper and lower roller seat, and teeth meshing with the teeth of the roller seat racks; and means, limiting vertical movement of the bolster to a range wherein the teeth of the rollers will be kept in mesh with the teeth of the roller seat racks.

5. A four wheel truck for railroad vehicles, comprising side frame members, each having two pedestals, a transom having two vertical side walls, connecting the side frames, each of the side walls having, near each end, an opening for a wear shoe lug; a shoe, adapted to take up the wear of the bolster, disposed at each of said openings, and comprising a flat vertical portion and a lug projecting into the opening; a bolster, fitted between the side walls of the transom; and means, permitting lateral motion of the bolster.

6. A four wheel truck for railroad vehicles, comprising two side frame members, each embodying two pedestals; a depressed portion disposed intermediate the pedestals, said portion having a horizontal top wall serving as a seat for an end of a transom; and two parallel, spaced, vertical walls, providing a spring pocket over each pedestal, and a groove on each side of the seat for the reception of locking tongue; a transom having an extension at each end, bearing on one of the seats on the side frames, each extension having a laterally extending tongue on each side, fitted in one of the grooves in the side frame; a bolster fitted in the transom; and means permitting lateral movement of the bolster, and for restoring it to central position.

7. A four wheel truck for railroad vehicles, comprising two side frame members, each formed as an integral casting, and embodying two pedestals; a depressed portion disposed intermediate the pedestals, said portion having a horizontal top wall serving as a seat for an end of a transom; and two parallel, spaced, vertical walls, providing a spring pocket over each pedestal, and a groove on each side of the seat for the reception of a locking tongue; a transom, formed as an integral casting, and comprising two spaced parallel, vertical side walls; a bottom wall, disposed near each end of the transom, for supporting a roller seat, and an extension at each end of the transom bearing upon the side frame seat, each extension having a tongue extending laterally from each of its sides, and fitted in one of the side frame grooves; a bolster, of the fish belly type, formed as an integral member and fitted down between the side walls of the transom; and means, permitting lateral movement of the bolster, and for restoring it to central position.

JAMES G. BLUNT.